Feb. 21, 1967     M. L. RAFFAELLI, SR     3,305,421
METHOD OF USING HEAT AND TEAR SEALING DIES
Original Filed May 21, 1962     4 Sheets-Sheet 1
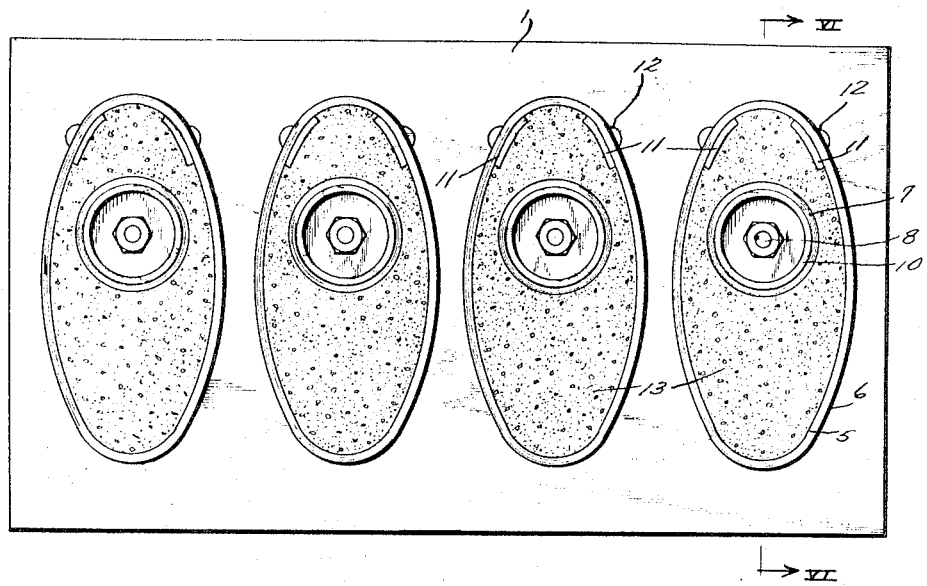
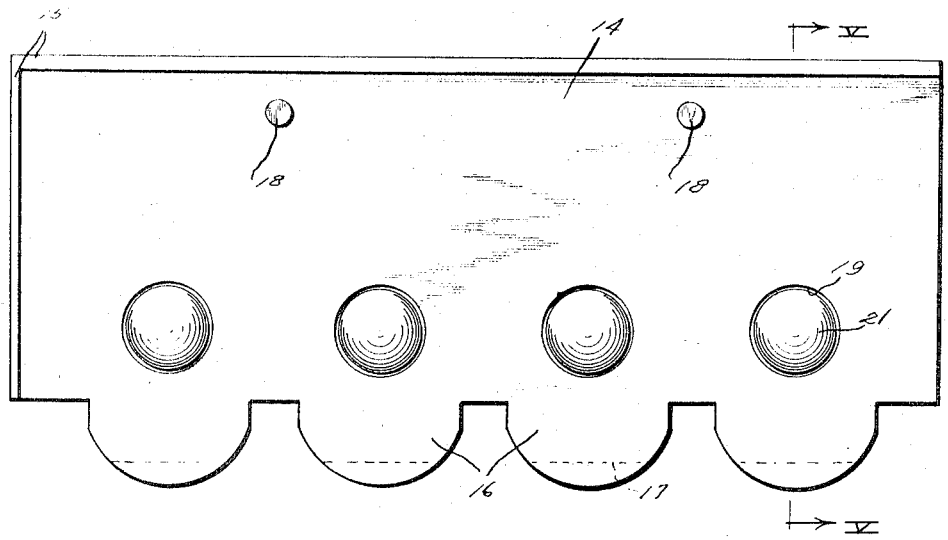
INVENTOR.
MILO L. RAFFAELLI SR.
BY
Hill, Sherman, Meroni, Gross & Simpson
ATTORNEY Feb. 21, 1967   M. L. RAFFAELLI, SR   3,305,421
METHOD OF USING HEAT AND TEAR SEALING DIES
Original Filed May 21, 1962   4 Sheets-Sheet 2
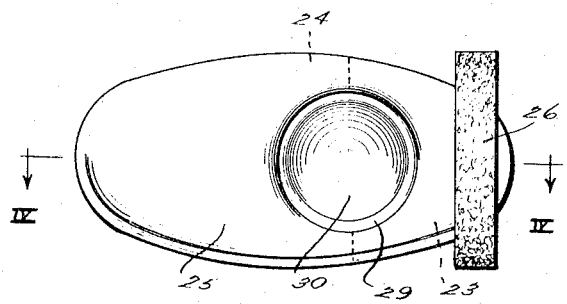
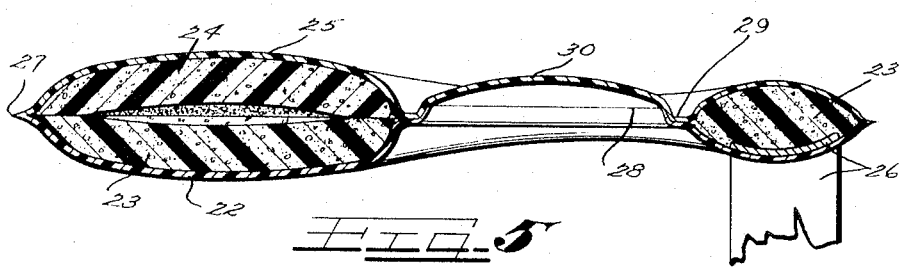
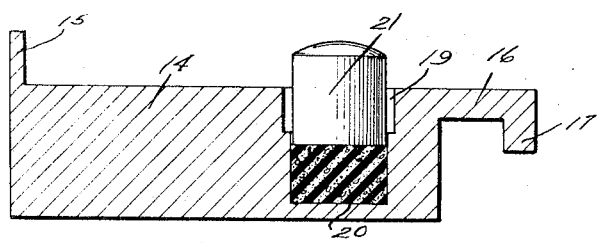
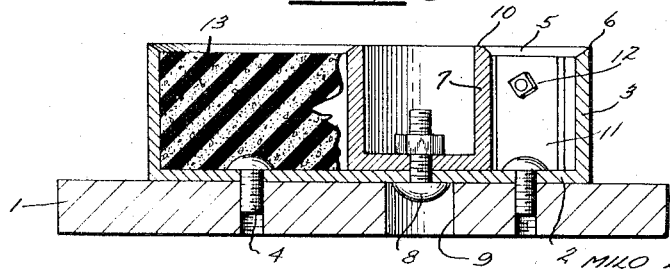
INVENTOR.
MILO L. RAFFAELLI SR.
BY
ATTORNEY Feb. 21, 1967   M. L. RAFFAELLI, SR   3,305,421
METHOD OF USING HEAT AND TEAR SEALING DIES
Original Filed May 21, 1962   4 Sheets-Sheet 3
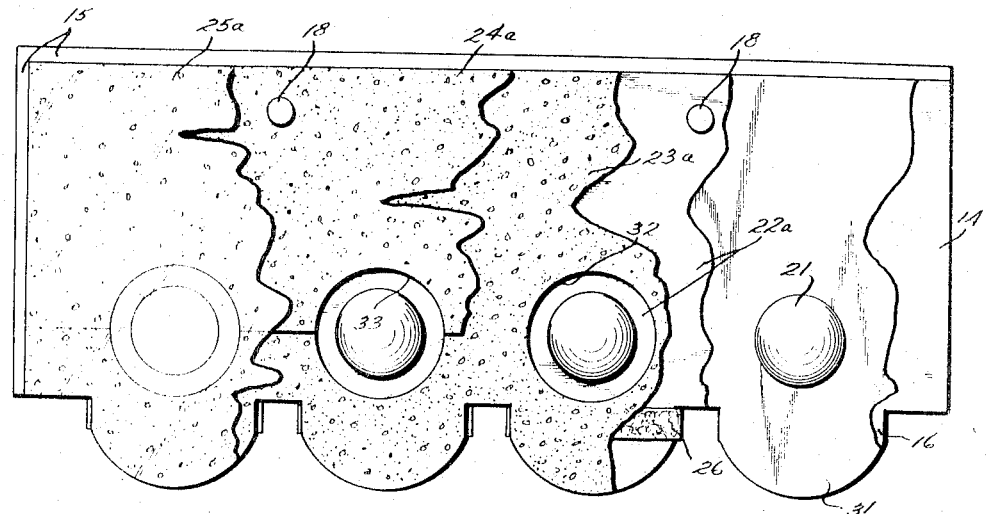
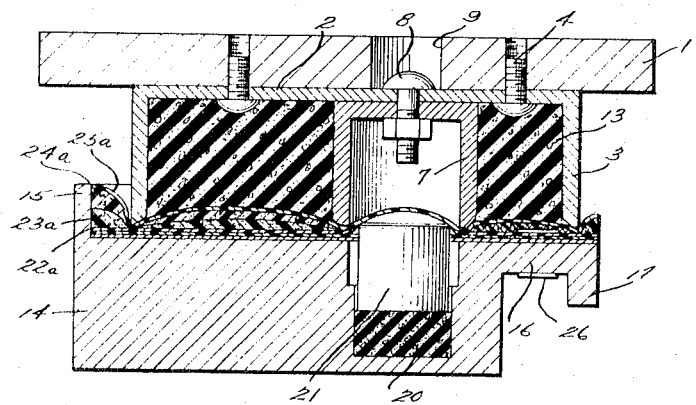
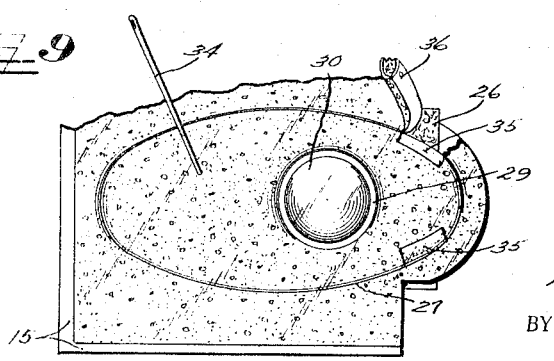
INVENTOR.
MILO L. RAFFAELLI SR.
BY
Hill, Sherman, Meroni, Gross & Simpson
ATTORNEY

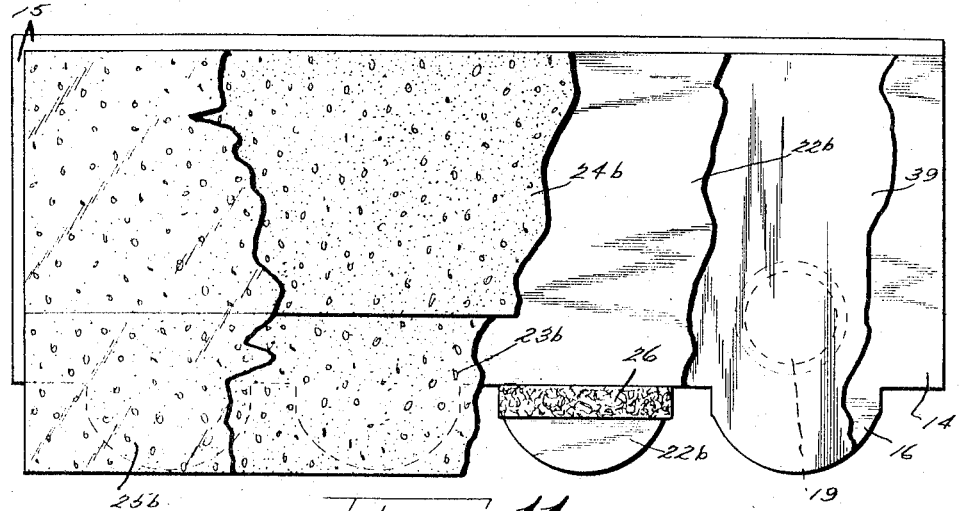
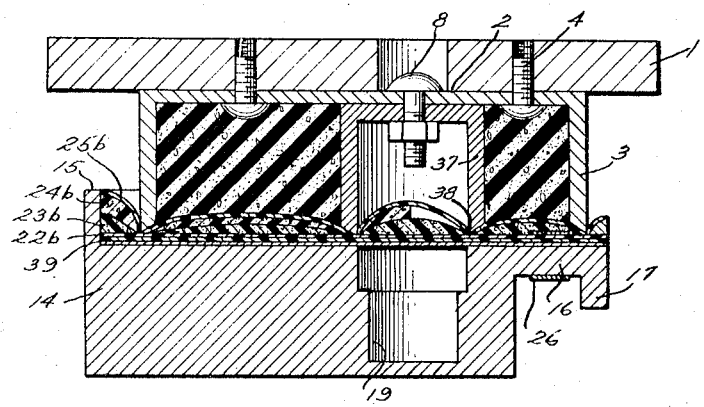
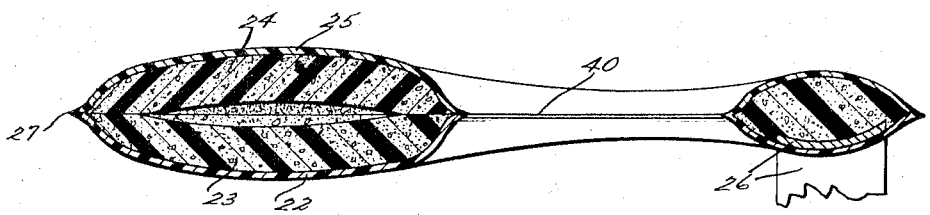
INVENTOR.
MILO L. RAFFAELLI SR
BY
ATTORNEY

United States Patent Office 3,305,421
Patented Feb. 21, 1967

3,305,421
METHOD OF USING HEAT AND TEAR SEALING DIES
Milo L. Raffaelli, Sr., Chicago, Ill., assignor to The Scholl Mfg. Co., Inc., Chicago, Ill., a corporation of New York
Original application May 21, 1962, Ser. No. 196,228, now Patent No. 3,244,573, dated Apr. 5, 1966. Divided and this application May 5, 1965, Ser. No. 453,326
5 Claims. (Cl. 156—223)

This application is a division of my copending application entitled, "Heat and Tear Sealing Dies and Method of Using the Same," filed May 21, 1962, Serial No. 196,228, now Patent No. 3,244,573.

This invention relates to improvements in a method of using heat and tear sealing dies, the dies being of the electrode type for electronic high frequency heat sealing, and particularly desirable for use with plastic sheet and foam materials, effecting both a fine edge heat seal seam and at the same time providing a tear line immediately adjacent the seam for the easy removal of waste stock from the finished product, the method of use being highly suitable in connection with the commercial manufacture of surgical pads, foot cushioning and corrective devices, miscellaneous applicators, and the like, although the method may be used for other purposes, as will be apparent to one skilled in the art.

Various articles, and particularly surgical pads, foot cushioning, corrective and supporting devices, among others, are now commercially made with one or more layers of thermoplastic sheet or film, and one or more layers of thermoplastic synthetic resin foam, with the layers joined together by heat seal seams made with suitable dies in an electronic heat sealing press, wherein the dies are brought together and a high frequency electrical current sufficient to fuse the plastic layers is passed through the dies in an extremely short interval of time. The articles so produced are far more durable, clean and sanitary appearing than articles heretofore made for the same purpose, but of different materials cemented or stitched together. However, in the manufacture of such articles economy of production is an essential since the heat sealed article although made of far better materials must still compete on the open market with the old type of articles for the same purpose made of more economic materials. In keeping with the necessary economy of production, particularly with regard to articles of smaller sizes, it is desirable to use multiple dies whereby a plurality of finished articles may be produced with a single operation of the dies.

Also, in keeping with economy it is at least highly desirable in connection with smaller articles to provide both a heat seal and tear seal seam, so that in one operation of the dies not only is a heat seal seam established, but a tear line is provided so that waste stock may be removed readily from around the finished article. In the past, this has been extremely difficult to accomplish particularly where the finished device is relatively thick in comparison with the overall area of the device. It has also been found to be practically impossible in the past, particularly with synthetic resin foams and sheets, to effect actual reshaping of an unsupported portion of the material, other than that contingent upon providing a bounding definition of the article, while establishing the heat seal seam. Further, in the past, all dies for this purpose were capable of producing only one specific article, either singly or in multiples, but the dies could not readily be changed or altered to provide an article of different specific character, another set of dies being necessary for the production of an article having any alteration in shape. Still another objection to dies of this character heretofore known resided in the difficulty entailed in quickly and accurately positioning a plurality of layers of material, particularly if some of the layers were of different sizes than the others, for multiple die operation.

With the foregoing in mind, it is an important object of the instant invention to provide a method of using electronic heat sealing dies in connection with synthetic resin foams, films, sheets and the like, in multiple and in a single operation produce finished products of relatively great thickness compared with the area of the product and establish all essential heat seal seams and all essential heat and tear seal seams in such operation.

Another object of this invention resides in the provision of a method of using heat sealing dies, highly suitable for acting upon synthetic resin foams and sheets, in such a manner as to complete a finished product in a single operation, both establishing the essential heat and tear seal seams and also reshaping and providing what may be termed a permanent set in the reshaped material of the final product.

Another desideratum of this invention is the production of a method of using heat sealing dies to produce articles varying in thickness from sheets of different areas, the dies being so constructed that precut blanks of stock material may be quickly, easily, and accurately positioned to be acted upon by the dies.

Still a further feature of the invention is the provision of a new and novel method of using electronic heat sealing dies in the making of surgical pads, cushioning and corrective devices, and similar articles among others, of heat sealable plastic material.

While some of the more salient features, characteristics and advantages of the instant invention have been above pointed out, others will become apparent from the following disclosures, taken in conjunction with the accompanying drawings, in which:

FIGURE 1 is a bottom plan view of an upper electrode die of a type usable in practicing principles of the instant invention;

FIGURE 2 is a top plan view of a lower electrode die of a type usable in practicing principles of the instant invention and which cooperates with the die of FIGURE 1;

FIGURE 3 is a plan view of an article made by operation of the dies of FIGURES 1 and 2;

FIGURE 4 is a fragmentary enlarged vertical sectional view of the article itself, taken substantially as indicated by the line IV—IV of FIGURE 3, looking in the direction of the arrows;

FIGURE 5 is a transverse vertical sectional view through the lower die, taken substantially as indicated by the line V—V of FIGURE 2;

FIGURE 6 is a transverse vertical sectional view through the upper die, taken substantially as indicated by the line VI—VI of FIGURE 1;

FIGURE 7 is a plan view of the lower die, showing the assemblage of blanks thereon for the production of the article of FIGURES 3 and 4, with parts broken away to reveal parts therebeneath;

FIGURE 8 is a vertical sectional view showing the formation of an article like that of FIGURE 3 by action of the dies;

FIGURE 9 is a fragmentary plan view illustrating a finished product, removal of waste therefrom, and the completion step of the method involved in making that product;

FIGURE 10 is a view similar in character to FIGURE 7 showing the assemblage of material on the lower die after the same has been adjusted for the production of an article differing specifically from that of FIGURES 3 and 4, parts being broken away to reveal parts therebeneath;

FIGURE 11 is a view similar in character to FIGURE 8, after the upper die has been adjusted for the specifically different article, showing the dies in operation forming the article; and FIGURE 12 is an enlarged fragmentary vertical sectional view through the article made by the adjusted dies of FIGURES 10 and 11.

As shown on the drawings:

In the illustrated embodiment of dies suitable for the practice of this invention, referring particularly to FIGURES 1, 2, 5 and 6, the upper die comprises a base plate 1 of electrically conductive metal. Secured to this base plate is a plurality of die members, there being four shown in the illustrated instance, but it will be understood that this number may be varied as desired or to correspond to the capacity of the particular heat sealing press available.

Each die member is preferably cup-shaped and comprises a bottom 2 and a depending skirt 3 integral therewith, the skirt in the illustrated instance being substantially oval in contour. The die member may be made satisfactorily of bronze, brass, or some other suitably electrically conductive metal of sufficient durability. The die member may be secured to the base in any satisfactory manner such as by bolts 4, FIGURE 6, and it may be desirable to solder or copper braze the element to the base as well to insure a complete electrical connection with the base. As also seen in FIGURE 6, the working edge of the skirt 3 slopes inwardly as indicated at 5 to provide a surrounding knife edge 6. This working edge arrangement provides both a heat and tear seal seam when the die is energized while pressing into the material being heat sealed.

Within the skirt 3 of the die element is an auxiliary cup-shaped die element 7 which may be removably secured to the bottom 2 of the die element by a bolt and nut assembly 8, access being provided thereto by way of a suitable aperture 9 in the die base 1, as seen in FIGURE 6. The auxiliary element 7 may have any suitable shape and size as desired for a particular finished product, and in the illustrated instance it is shown circular. The working edge of the skirt of the auxiliary element 7 is flat as indicated at 10 so that this auxiliary element will provide a heat seal seam but no tear line. Where the finished product is to be provided with a digit loop, each die element is preferably provided at the desired location for the digit loop with a pair of opposed upstanding heat sealing strips 11—11 bolted, or equivalently removably secured to the inner face of the skirt 3 as indicated at 12, the upper ends of these strips being flat so as to provide only a heat seal seam but no tear line, and terminating even with the inside edge of the slope 5 on the skirt 3 well below the knife edge 6. Each die member is preferably relieved inside the skirt 3 and around the auxiliary element 7 by a resilient block 13 or stack of blocks as may be desired, which relief substance 13 may be sponge rubber or any equivalent material. The provision of the relief substance is to insure all resultant articles being of uniform thickness.

The lower die, seen in FIGURES 2 and 5, need not be provided with any outline defining means, but may satisfactorily be in the nature of a flat plate 14 of electrically conductive material, preferably provided with an upstanding guide flange 15 along the rear and one end edge. At the front side edge thereof, the plate is formed with a plurality of outwardly extending curvate projections 16, there being one for each of the die elements in the upper die. Each of these projections 16 is provided with a depending flange 17 which may satisfactorily be of sector shape. At the rear of the plate 14 spaced somewhat inwardly from the flange 15 are a pair of upstanding guide pins 18—18, any suitable or desirable number being used.

The lower die is also provided with a recess 19 in proper location to be surrounded by the working edge of the auxiliary die element 7 when the dies are brought together. Each such recess is provided with a relief block 20 of sponge rubber or equivalent material, and seated freely on the block 20 is a dome forming plug 21 which may satisfactorily be formed of thermosetting plastic or other suitable non-conductive material. This dome forming plug is relieved because while the pieces to be joined together by the dies are stacked upon the lower die, more than useful height of the plug is needed to accommodate the stacked or superposed blanks and during operation of the dies as the blanks are compressed, the plug 21 descends against the action of the relief block 20 to the proper height for forming a dome in the finished article.

In FIGURES 3 and 4 I have illustrated the product made by the dies above described. In this instance the product is in the form of a surgical pad having an elastic digit loop, the pad being shaped for the alleviation of a bunion or similar affliction of the foot, and it will of course be understood that made in a smaller size, the pad will be effective for the alleviation of a tailor's bunion. The particular pad illustrated is one desirable for use where there may be exudation from the affliction, or where the affliction is sensitive to frictional contact with even light wearing apparel such as a stocking.

The pad comprises a lower layer 22 of heat sealable plastic film such as a vinyl or acetate film, a lower layer 23 of heat sealable foam such as polyvinyl chloride foam, polyurethane foam, or equivalent material, a partial upper layer 24 of the same foam, and a cover layer 25 preferably of transparent plastic film. Extending inside one end of the pad so as to overlie the bottom film layer 22 is an elastic digit loop 26 which may satisfactorily be formed of commonly known woven fabric elastic ribbon having its ends secured together in any suitable manner such as by stitching or stapling to form the loop, the secured ends being inside the pad.

These layers are joined together by a fine line heat and tear seal seam 27 defining the bounding edge of the pad. The lower film layer 22 is apertured as indicated at 28, the lower foam layer is also apertured in the same region, the upper foam layer is cut away, while the top film layer 24 remains intact. A heat seal seam 29 joins at least the films 22 and 25, and possibly the adjacent edge of the foam layers surrounding a dome 30 formed in the top film 25 at the time the heat seal seams are established to provide a smooth slick covering over the affliction itself.

In making pads of the character shown in FIGURES 3 and 4, the upper face of the lower die 14 is first covered with a blank of material 31 to function as a dielectric buffer, and this sheet may satisfactorily be made of polytetrafluoroethylene. This sheet is merely for the protection of the dies and is immune to the heat sealing operation. The sheet is apertured to fit over the guide pins 18—18 and over each of the dome molding plugs 21, and this sheet may remain on the die indefinitely through numerous operations. The layers that make up the finished article are stacked on top of the buffer sheet 31.

It will be understood that the layers of material making up the finished article are in the form of precut blanks of a size to fit the upper face of the lower die. Each of these blanks is provided with apertures for engagement over the guide pins 18—18 and also, with one exception, provided with apertures to receive the upwardly projecting dome plug 21. Each of the blanks, with a different exception, is also shaped to provide curvate forwardly extending projections corresponding in size and location with the projection 16 on the lower die.

First upon the buffer sheet 31 is a blank 22a which ultimately forms the lower film 22 in the finished article. The apertures for the dome molding plugs 21 in this film 22a are of a size to just intimately fit over the dome plug. Next the digit loop 26 is placed in position over the projecting portion 16 of the die, as seen in FIGURES 7 and 8, and the depending sector flange 17 maintains this loop in position against sliding off the projection. The loop overlies the blank 22a. A blank 23a of foam material overlies the film blank 22a and the digit loop 26. This blank 23a is provided with an aperture 32 for each dome plug 21 that is noticeably larger than the plug so as to leave a space entirely around the plug as best seen in FIGURE 7. On the foam blank 23a a partial foam blank 24a is positioned, this blank having a circular notch 33 therein for each of the dome plugs 21, the notch being of the same diameter as the aperture in the first foam blank 23a. Finally the top film blank 25a is placed in position, this film having no aperture therein except those for the guide pins 18—18, and this film completely overlies each of the dome plugs 21.

With all of the blanks so positioned, the upper die is next brought down upon the material on the lower die as shown in FIGURE 8 under pressure, and when the respective blanks have been compressed to substantially the degree shown in FIGURE 8, a charge of high frequency electrical current is passed between the dies, and a very few seconds is sufficient for that current to effect the heat seal seam 29 occurring around the dome molding plug 21 in spaced relationship thereto and also provide the heat and tear seal seam 27 defining the bounding edge of the device. The dies are shown in their position at the completion of an operation in FIGURE 8, and it will be noted that the relief block 20 for each dome molding plug 21 is somewhat compressed below its original height seen in FIGURE 5, and the relief block 13 in the upper die has also been compressed in somewhat of a dome shape. This relief block in the upper die insures all of the resultant pads as being of the same thickness, while the relief block 20 permits the dome forming plug to extend upwardly sufficiently for positioning of the blanks, and then yield until it is at the proper height to form the dome 30 in the upper film 25. The actual height of the finished dome may be controlled or varied by the use of a shorter or longer dome forming plug 21. In forming the dome, as the upper die is pressed upon the lower die, the film of the blank 25a is stretched cold and heat sealed at its lower edge at least to the lower film 22. Thus a permanent deformation is established in the upper film and it will retain its dome shape throughout the life of the pad.

During the pressing of the blanks together the air in the foam layers 23 and 24 is squeezed out to a material extent prior to the establishment of the heat seal seams. The finished pad is therefore flatter than desired by virtue of the partial vacuum inside it. Therefore it is desirable, as a final step in the method, to provide either the upper or lower film 22 or 25 with a minute perforation such as by a needle 34 as seen in FIGURE 9. This permits air to enter inside the casing formed by the two films and the foam layers expand as much as possible in the confined space, restoring the pad to the desired thickness and rendering it highly resilient and comforatable without any danger of the foam migrating laterally under pressure points.

The two strips 11—11 in the upper die member also effect heat sealing for their widths, which short seams as indicated at 35—35 in FIGURE 9 are substantial enlargements of the heat and tear seal seam 27 formed by the knife edge 6 of the upper die as well as the sloping portion 5 thereadjacent. In effect, the bounding heat seal seam is widened at the location of the strips 11—11 directly over the digit loop. At the time the heat seal seam is formed, aided by the location of the strips 11—11, the thermoplastic material of the layers is melted into the elastic digit loop. The tear seal, effected by the sharp edge 6, is not disturbed by way of the attachment of the band, and as indicated at 36 in FIGURE 9 waste stock may readily be torn from the finished pad directly over the band as well as elsewhere. The band is not severed by the edge 6 of the top die, and this is controlled by the distance of travel of the top die. As to the particular showing in FIGURE 9, the waste stock would not be broken, as appears for illustrative purposes only, but the entire waste would be removed from around the finished pad in one piece.

It will be noted that the pad is formed with a single operation of the dies, and a portion of the material making up the pad is cold stretched and given a permanent set to provide the dome 30 which overlies the affliction.

Now, with reference to FIGURES 10, 11 and 12, I have illustrated how the dies may be rearranged to provide a pad without a dome, but instead having an aperture entirely through the pad where the dome 30 was previously. In this instance, the same main dies are used, but the guide pins 18—18 and the dome forming plugs 21 have been removed from the lower die. The upper die has been arranged by eliminating the auxiliary heat sealing die element 7 and substituting therefor a similarly shaped die element 37 having an inner knife edge 38, FIGURE 11, of the same character as the knife edge 6 on the skirt 3 of the main die element defining the outline of the finished article. This substitution is easily accomplished by releasing the bolt nut assembly 8, removing the element 7, substituting the element 37, and tightening the bolt nut assembly, for each die element embodied in the upper die.

In this instance, since there is to be no cold stretching and deforming of any of the laminated sheets, as when the dome was provided in the first described embodiment, the blanks do not have to be apertured to fit over the pins 18—18, and the only preforming necessary is to cut the blanks in plain rectangular sheets of a size to fit over the lower die. These blanks then may all be positioned by seating them snugly against the upstanding flange 15 on the lower die, as seen in FIGURE 10.

Since the die element 37 will remove a circle of material larger than the recess 19 for the dome shaping plug 21 in the lower die, the same dielectric material 31 may be utilized, or an unapertured sheet of dielectric material 39, FIGURE 10, may be laid over the lower die 14. On top of the dielectric sheet, a lower film 22b, is placed, and in the event the toe or digit loop 26 is to be utilized, this lower film 22b will be precut to fit individually over each of the projections 16 on the lower die. In the event the digit loop is not utilized, and the pad is to be completed without it, the film blank 22b may satisfactorily be rectangular. On the film blank 22b a foam blank 23b is positioned, and then a foam blank 24b of lesser width is placed on top of the larger foam blank, and finally the top film blank 25b is placed. After the blanks have all been positioned, the dies are brought together in the manner seen in FIGURE 11, and upon pressure of the upper die on the lower and the charge of high frequency electrical current therethrough, not only is the heat seal seam 27 defining the outline of the pad established, but simultaneously therewith an inside heat and tear seal seam 40 is established by the die element 37, so that in the resultant pad the heat seal seam 40 defines an open aperture, after the removal of the waste as above described.

It will be noted that with the use of the present dies, in the method herein set forth, a pad having a set dome-like formation to overlie the affliction may be provided, pads with or without digit loops may be provided, a pad having a complete aperture for the reception of the affliction may be provided, the dome shaped portion or the aperture through the device may have substantially any desired shape, and all of the pads are uniform in thickness regardless of the fact that each pad is thicker in one portion than in another. After the operation of the dies it is a simple expedient to put a minute perforation in each of the pads to cause the foam material to swell and render the pad of the right size and resiliency. The dies in the practice of the method are both extremely economical and quite satisfactory for commercial production in a competitive field. Any changes in the specific construction of the pad is accomplished by a simple adjustment of the die member requiring a minimum of time and labor.

It will be understood that modifications and variations

I claim as my invention:

1. The method of making a cushioning pad including the steps of
    superposing layers of fusible material having aligned apertures therein,
    covering said layers with a top imperforate layer,
    heat and tear sealing said layers in a seam defining the bounding edge of the pad around said apertures, and
    simultaneously deforming said top layer into a dome over said apertures.

2. The method of making a cushioning pad including the steps of
    superimposing layers of fusible material having aligned apertures therein,
    covering said layers with a top imperforate layer,
    heat and tear sealing said layers in a seam defining the bounding edge of the pad around said apertures, and
    joining all said layers by a heat seal seam around said apertures, and
    deforming said top layer into a dome over said apertures.

3. The method of making an article from heat sealable material, including the steps of
    superposing a cover layer and a cushion layer having aligned openings therein,
    placing an imperforate top cover layer on said cushion layer,
    compressing and heat sealing all said layers together by a heat seal seam defining the outline of the article, and
    providing a deformation in said top layer adjacent the openings in the other layers.

4. The method of making an article from heat sealable material, including the steps of
    superposing a cover layer and a cushion layer having aligned openings therein,
    placing an imperforate top cover layer on said cushion layer,
    compressing and heat sealing all said layers together by a heat seal seam defining the outline of the article,
    joining said layers by a heat seal seam around said openings, and
    simultaneously forming a dome in said cover layer over said openings.

5. The method of making an article from fusible materials including the steps of
    superposing a thin cover layer of thermoplastic material and a thicker foam cushion layer having aligned openings therein,
    placing an imperforate top cover layer over said cushion layer,
    contemporaneously compressing said foam layer and joining said cover layers by a heat seal seam around said openings and a heat seal seam defining the outline of the article,
    simultaneously providing a permanent deformation in the top cover layer over said openings, and
    thereafter puncturing one of said cover layers to admit air for expansion to said foam layer.

References Cited by the Examiner

UNITED STATES PATENTS

| | | | |
|---|---|---|---|
| 2,750,606 | 6/1956 | Freedlander et al. | 5—337 |
| 2,803,023 | 8/1957 | Rosenberg et al. | 5—337 |
| 2,878,153 | 3/1959 | Hacklander | 264—248 |
| 2,898,634 | 8/1959 | Alderfer | 264—47 |
| 2,917,842 | 12/1959 | Scholl | 36—71 |
| 3,083,392 | 4/1963 | Sewell | 15—118 |

EARL M. BERGERT, *Primary Examiner.*

DOUGLAS J. DRUMMOND, *Examiner.*